United States Patent
Mase et al.

(10) Patent No.: US 10,876,841 B2
(45) Date of Patent: Dec. 29, 2020

(54) MOVING BODY MANAGEMENT SYSTEM AND METHOD

(71) Applicant: HITACHI, LTD., Tokyo (JP)

(72) Inventors: Masayoshi Mase, Tokyo (JP); Yuxin Liang, Tokyo (JP); Junji Yamamoto, Tokyo (JP)

(73) Assignee: HITACHI, LTD., Tokyo (JP)

(*) Notice: Subject to any disclaimer, the term of this patent is extended or adjusted under 35 U.S.C. 154(b) by 55 days.

(21) Appl. No.: 15/756,716

(22) PCT Filed: Apr. 6, 2016

(86) PCT No.: PCT/JP2016/061229
§ 371 (c)(1),
(2) Date: Mar. 1, 2018

(87) PCT Pub. No.: WO2017/175327
PCT Pub. Date: Oct. 12, 2017

(65) Prior Publication Data
US 2018/0274929 A1 Sep. 27, 2018

(51) Int. Cl.
*G01C 21/20* (2006.01)
*G08G 3/02* (2006.01)
(Continued)

(52) U.S. Cl.
CPC .............. *G01C 21/20* (2013.01); *G08G 3/02* (2013.01); *G08G 5/0026* (2013.01); *G08G 5/0039* (2013.01); *G08G 5/045* (2013.01)

(58) Field of Classification Search
CPC . Y02T 10/7291; Y02T 90/162; Y02T 90/161; G01C 21/26; G01C 21/20;
(Continued)

(56) References Cited

U.S. PATENT DOCUMENTS

| 7,817,079 B1 | 10/2010 | Funk |
| 2012/0023057 A1 | 1/2012 | Winberry et al. |

(Continued)

FOREIGN PATENT DOCUMENTS

| JP | 52-46288 A | 4/1977 |
| JP | 2006-065831 A | 3/2006 |

(Continued)

OTHER PUBLICATIONS

International Search Report of PCT/JP2016/061229 dated Jun. 21, 2016.

*Primary Examiner* — Tuan C To
*Assistant Examiner* — Paul A Castro
(74) *Attorney, Agent, or Firm* — Mattingly & Malur, PC

(57) ABSTRACT

Provided is a technique for reducing the calculation load in navigation management of a moving body within a freely navigable space. The system has a storage unit 21 for storing movement locus data showing a plurality of movement loci in which a moving body is moved in a two-dimensional or three-dimensional space in which free movement is possible; a network model management unit 11 for integrating sections approximated by the plurality of movement loci on the basis of the movement locus data, and generating a network model showing a route within the space; a navigation schedule calculation unit 13 for calculating a navigation schedule when a plurality of moving bodies planning to pass within the space navigate within that space according to the network model route; and a display processing unit 15 for outputting the calculated navigation schedule to a display apparatus.

20 Claims, 14 Drawing Sheets

(51) Int. Cl.
*G08G 5/04* (2006.01)
*G08G 5/00* (2006.01)

(58) Field of Classification Search
CPC ............... G01C 21/34; G01C 21/3415; G01C 21/3446; G01C 23/005; G01C 21/3423; G01C 21/343; G01C 21/3697; G01C 21/36; G06Q 10/08; G06Q 50/30; G06Q 10/047; G05D 2201/0213; G05D 1/0223; G05D 1/0027; G05D 1/0212; G05D 1/0276; G05D 1/0291; G05D 1/0274; G05D 1/0225; G05D 1/0278; G05D 1/0676; G05D 2201/0216; G05D 1/00; G05D 1/0055; G05D 1/02; G05D 1/0202; G05D 1/021; G05D 1/027; G05D 1/0293; G05D 1/101; G05D 1/104; G06F 16/29; G07C 5/008; G07C 5/02; G07C 5/0808; G01S 13/91; G01S 19/01; G01S 19/42; G01S 7/003; G08G 1/096844; G08G 1/096827; G08G 1/13; G08G 1/22; G08G 5/0013; G08G 5/0043; G08G 1/0112; G08G 1/096833; G08G 1/0969; G08G 1/20; G08G 5/0026; G08G 5/0039; G08G 5/0069; G08G 5/0082; G08G 5/025; G08G 1/0125; G08G 1/096811; G08G 1/127; G08G 1/161; G08G 1/163; G08G 5/00; G08G 5/065

See application file for complete search history.

(56) References Cited

U.S. PATENT DOCUMENTS

| 2012/0116678 | A1* | 5/2012 | Witmer | G01C 21/32 |
| | | | | 702/5 |
| 2014/0278062 | A1* | 9/2014 | Han | G08G 5/045 |
| | | | | 701/423 |

FOREIGN PATENT DOCUMENTS

| JP | 2007-057499 A | 3/2007 |
| JP | 2012-514198 A | 6/2012 |
| JP | 2015-186956 A | 10/2015 |

* cited by examiner

Fig. 3

Movement locus data 210

| Locus ID | Moving body ID | Spot no. | Latitude | Longitude | Time and date |
|---|---|---|---|---|---|
| R001 | 1234 | P101 | XXX | XXX | YYMMDD HH:MM:SS |
| ... | ... | P111 | XXX | XXX | YYMMDD HH:MM:SS |
|  |  | ... | ... | ... | ... |

Columns: 211, 212, 213, 214a, 214b, 215

Fig. 4

Integrated locus data 230

| Integrated locus ID | Spot no. | Latitude | Longitude | Corresponding locus ID | Start point | End point |
|---|---|---|---|---|---|---|
| U001 | P501 | XXX | XXX | R254 | P195 | P389 |
| ... | P511 | XXX | XXX | R163 | P339 | P223 |
|  | ... | ... | ... | ... | ... | ... |
|  | ... | ... | ... |  |  |  |

Columns: 231, 232, 233a, 233b, 234, 235, 236

Fig. 5

Node data 250

| Node ID | Node range | | | | Previous edge | Next edge | Integrated locus ID | Spot no. |
|---|---|---|---|---|---|---|---|---|
| N584 | XXX | XXX | XXX | XXX | E057 | E058 | R854 | P524 |
| | | | | | E125 | E126 | R681 | P412 |
| | | | | | ... | ... | ... | ... |

Column labels: 251, 252, 253, 254, 255, 256

Fig. 6

Edge data 260

| Edge ID | Width | Start point node ID | End point node ID | Integrated locus ID | Start point spot no. | End point spot no. |
|---|---|---|---|---|---|---|
| E001 | XXX | N108 | N109 | R785 | P524 | P868 |
| ... | ... | ... | ... | R681 | P412 | P620 |
| | | | | ... | ... | ... |

Column labels: 261, 262, 263, 264, 265, 266, 267

Fig. 18A

Navigation schedule data 270A

| Moving body ID | Node A | Node B | Node C | Node D | Node E |
|---|---|---|---|---|---|
| 001 (Vessel A) | 10:00 | 10:05 | 10:10 | 10:15 | |
| 002 (Vessel B) | 10:03 | 10:08 | | | 10:20 |
| 003 (Vessel C) | | | 10:10 | | 10:00 |
| ... | | | | | |

Fig. 18B

Navigation schedule data 270B

| Moving body ID | Node A | Node B | Node C | Node D | Node E |
|---|---|---|---|---|---|
| 001 (Vessel A) | 10:00 | 10:05 | 10:15 | 10:20 | |
| 002 (Vessel B) | 10:05 | 10:10 | | | 10:22 |
| 003 (Vessel C) | | | 10:10 | | 10:00 |
| ... | | | | | |

MOVING BODY MANAGEMENT SYSTEM AND METHOD

TECHNICAL FIELD

The present invention relates to a technique for managing navigation of a moving body within a freely navigable space.

BACKGROUND ART

There are systems which manage moving bodies navigating through a space for the purpose of supporting a traffic control service and the like.

For example, PTL 1 describes calculating a typical route within waters on the basis of history of vessel information indicating a route of a vessel having passed within prescribed waters.

CITATION LIST

Patent Literature

[PTL 1]
Japanese Patent Application Publication No. 2015-186956

SUMMARY OF INVENTION

Technical Problem

When managing navigation of moving bodies within a freely navigable space, there is a problem in that an increase in the number of target moving bodies within the space causes an amount of calculations for predicting courses, calculating distances between moving bodies, and the like to become enormous.

In addition, even when most vessels normally navigate along prescribed routes, the vessels may deviate from their normal routes due to the presence of an obstacle or other external factors such as construction and may end up temporarily navigating along different routes. Such dynamically changing routes must also be accommodated in order to provide delicate traffic control support.

In consideration thereof, an object of the present invention is to provide a technique for reducing calculation load in navigation management of a moving body within a freely navigable space.

Another object of the present invention is to provide a technique capable of accommodating a dynamic change to a route in navigation management of a moving body within a freely navigable space.

Solution to Problem

A moving body management system according to an embodiment of the present invention is a moving body management system including: a storage device configured to store movement locus data showing a plurality of movement loci in which a moving body is moved in a two-dimensional or three-dimensional space in which free movement is possible; and a CPU (Central Processing Unit). The CPU is configured to execute: a process of integrating sections approximated by the plurality of movement loci on the basis of the movement locus data, and generating a network model showing a route within the space; a process of calculating a navigation schedule when a plurality of moving bodies planning to pass within the space navigate within that space according to the network model route; and a process of outputting the calculated navigation schedule to a display apparatus.

A moving body management system according to another embodiment of the present invention includes: storage means configured to store movement locus data showing a plurality of movement loci in which a moving body is moved in a two-dimensional or three-dimensional space in which free movement is possible; means configured to configure an edge in a section approximated by the plurality of movement loci and arrange nodes at both ends of the edge on the basis of the movement locus data, and generate a network model that is constituted by a plurality of nodes and a plurality of edges connecting the nodes and shows a route within the space; means configured to calculate a navigation schedule including estimated arrival time points of a plurality of moving bodies planning to pass within the space at the respective nodes when the moving bodies navigate within that space according to the network model route; means configured to correct the navigation schedule on the basis of constraints included in the respective nodes and regarding a time interval of estimated arrival time points of moving bodies and the navigation schedule, by adjusting the estimated arrival time points of the plurality of moving bodies at the respective nodes so as to satisfy the constraints; and means configured to output the corrected navigation schedule.

BRIEF DESCRIPTION OF DRAWINGS

FIG. 3 shows an example of a data structure of movement locus data 210.

FIG. 4 shows an example of a data structure of integrated locus data 230.

FIG. 5 shows an example of a data structure of node data 250.

FIG. 6 shows an example of a data structure of edge data 260.

FIG. 18 is an explanatory diagram of navigation schedule data.

DESCRIPTION OF EMBODIMENTS

Hereinafter, a moving body management system according to an embodiment of the present invention will be described with reference to the drawings. The moving body management system according to the present embodiment integrates sections approximated by movement loci of a plurality of moving bodies having navigated within a space that is freely navigable by moving bodies, and generates a network model with an integrated locus as a route. In addition, when a moving body navigating within the space navigates according to the route of the network model, the moving body management system generates a navigation schedule in accordance with prescribed constraints and manages navigation of the moving body.

The present embodiment targets a vessel as an example of a moving body and assumes that a space in which a moving body is freely movable is the sea. However, a present system 1 can also be applied to other moving bodies and spaces. For example, the present system 1 can also be applied to an aircraft or a drone moving within a three-dimensional space.

Figure 1:
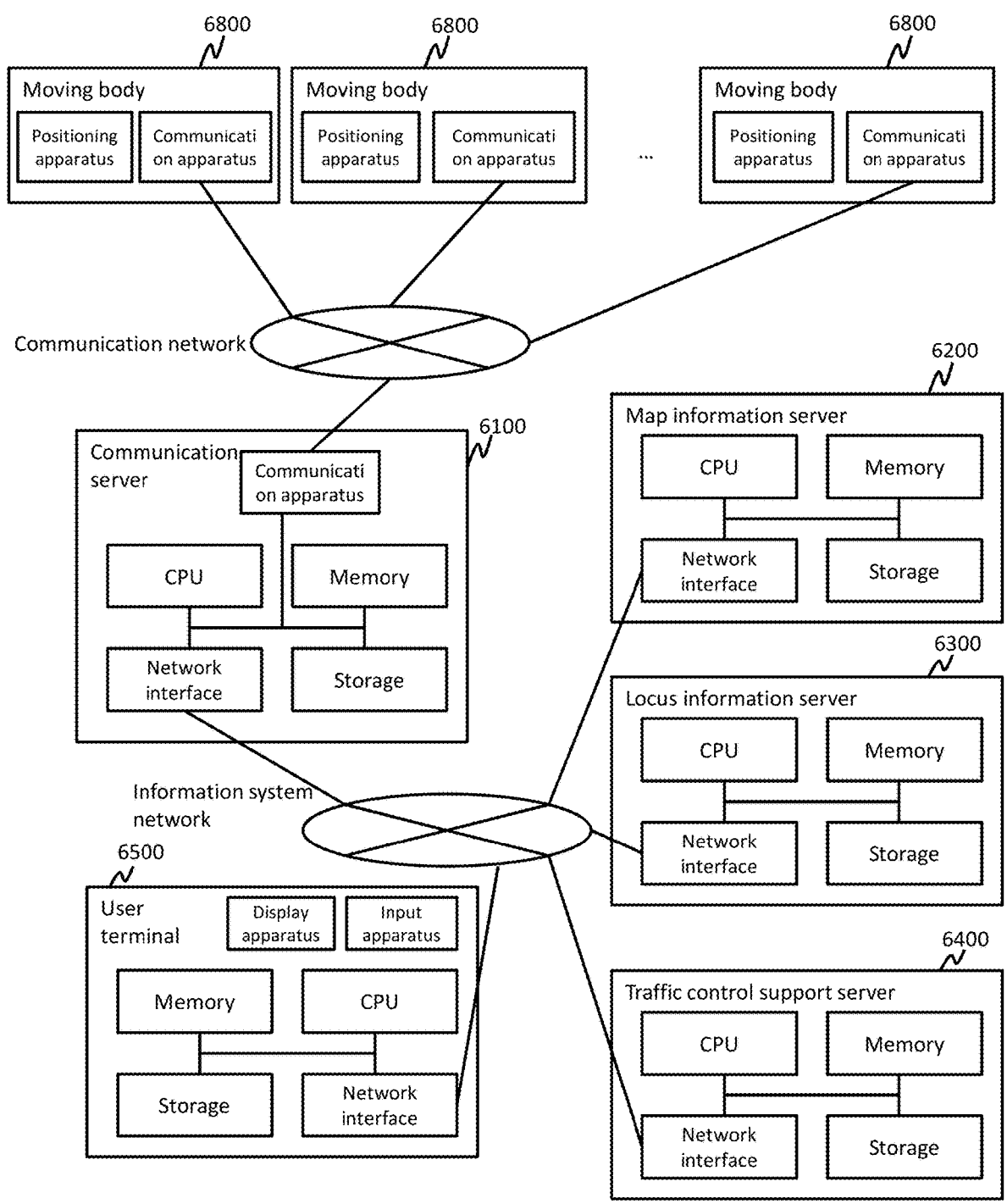
FIG. 1 shows an example of a system configuration of a moving body management system 1 according to an embodiment of the present invention.

FIG. 1 shows an example of a system configuration of the moving body management system 1 according to an embodiment of the present invention.

As shown in FIG. 1, the moving body management system 1 includes a communication server 6100, a map information server 6200 for managing map data, a locus information server 6300 for managing information regarding movement loci of moving bodies, a traffic control support server 6400 for supporting a traffic controller who performs traffic control with respect to moving bodies, and a user terminal 6500 for providing an interface with respect to a user such as a traffic controller. The communication server 6100, the map information server 6200, the locus information server 6300, the traffic control support server 6400, and the user terminal 6500 may all be general-purpose computers, and each includes a CPU (Central Processing Unit), a memory, a storage (a storage device), and a network interface. The communication server 6100, the map information server 6200, the locus information server 6300, the traffic control support server 6400, and the user terminal 6500 are coupled to one another via an information system network.

Moving bodies 6800 respectively include a positioning apparatus for measuring a current position such as a GPS (Global Positioning System) and a communication apparatus. The moving body 6800 transmits its own positional information (for example, a latitude, a longitude, and a positioning time point) measured by the positioning apparatus to the communication server 6100, and receives a traffic control instruction from the communication server 6100 and conveys the received traffic control instruction to occupants of the moving body.

The communication server 6100 further includes a communication apparatus and communicates with the communication apparatuses mounted to the plurality of moving bodies 6800 to be management targets of the moving body management system 1.

The map information server 6200 includes, for example, a map information database 17 to be described later.

The locus information server 6300 includes, for example, a movement locus data storage unit 21 which accumulates positional information of respective moving bodies collected from the moving bodies 6800 and an integrated locus data storage unit 23.

The traffic control support server 6400 includes, for example, a navigation plan data storage unit 19, a network model data storage unit 25, and a navigation schedule data storage unit 27 to be described later. A computer program for realizing a network model management unit 11, a node adjustment unit 12, a navigation schedule calculation unit 13, a traffic control support processing unit 14, and a display processing unit 15 to be described later may be stored in a storage of the traffic control support server 6400, in which case functions to be described later may be realized when the computer program is executed by a CPU of the traffic control support server 6400.

Figure 2:
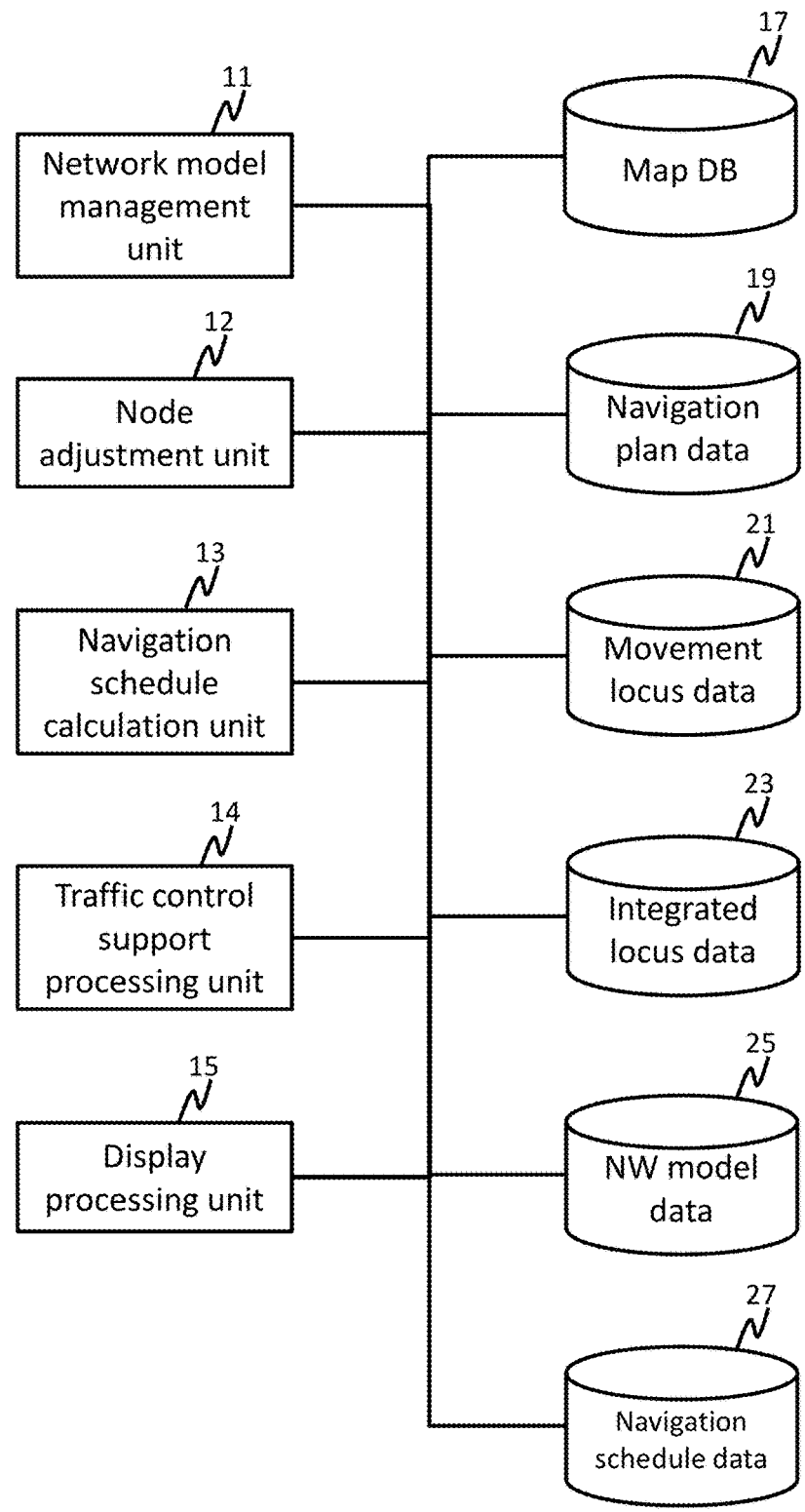
FIG. 2 is a functional configuration diagram of the moving body management system 1.

FIG. 2 is a functional configuration diagram of the moving body management system 1.

As shown in FIG. 2, the moving body management system 1 includes the network model management unit 11, the node adjustment unit 12, the navigation schedule calculation unit 13, the traffic control support processing unit 14, the display processing unit 15, the map information database 17, the navigation plan data storage unit 19, the movement locus data storage unit 21, the integrated locus data storage unit 23, and the network model data storage unit 25.

The network model management unit 11 generates, on the basis of movement loci of moving bodies having moved in a freely navigable two-dimensional or three-dimensional space, a network model showing a route along which a moving body can pass. For example, the network model management unit 11 may determine a route by integrating sections approximated by a plurality of movement loci on the basis of movement locus data. The network model management unit 11 may provide a check point for checking an arrival time point or a time point of passage of moving bodies midway along the route.

A network model generated by the network model management unit 11 may include a plurality of nodes and a plurality of edges indicating routes which connect the nodes. In the embodiment described below, each node has a function of the check point.

The node adjustment unit 12 adjusts nodes included in a network model generated by the network model management unit 11. For example, the node adjustment unit 12 may increase the number of nodes (add nodes) or reduce the number of nodes (delete nodes). Increasing the number of nodes to shorten distances of edges connecting between the nodes enables a navigation schedule to be managed with higher accuracy. Reducing the number of nodes enables a load related to calculations for calculating and correcting a navigation schedule to be reduced.

The navigation schedule calculation unit 13 calculates a navigation schedule of moving bodies navigating within a space. For example, the navigation schedule calculation unit 13 may calculate a navigation schedule in a case where a plurality of moving bodies planning to pass within a freely navigable space navigate within that space according to routes of the network model. For example, on the basis of movement locus data, the navigation schedule calculation unit 13 may predict a movement speed of each of a plurality of moving bodies and calculate an estimated arrival time point at a prescribed spot within a network model on the basis of the movement speed. For example, a movement speed prediction may be calculated from previous movement locus data of a same moving body or calculated from an average speed of moving bodies with similar or comparable sizes. The calculated navigation schedule data is stored in the navigation schedule data storage unit 27. The navigation schedule data may be made displayable on the user terminal 6500.

The traffic control support processing unit 14 performs traffic control support using a network model. For example, navigation-related risks such as an excessive approach risk which is created when a moving body moves in accordance with a network model on the basis of a navigation schedule may be detected. When there is an excessive approach risk, the traffic control support processing unit 14 may perform navigation schedule adjustment so as to avoid the excessive approach. The traffic control support processing unit 14 may notify a moving body of the navigation schedule prior to adjustment or after adjustment or may transmit the navigation schedule prior to adjustment or after adjustment to the user terminal 6500 to be displayed on a display apparatus. In addition, when it is expected that there is an excessive approach risk or the like, the traffic control support processing unit 14 may output a prescribed alert to a moving body and/or the user terminal 6500.

The display processing unit 15 generates screen data for screens to be displayed on a display apparatus of the user terminal 6500. For example, screen data may be generated to cause the display apparatus of the user terminal 6500 to display screens for displaying a map image, movement loci, an integrated locus, a network model, and the like to be described later (a map screen 3000, a movement locus screen 3100, network model screens 3200 to 3500, a node adjustment screen 4000, and a navigation schedule data display screen 5000) as well as navigation schedule data (FIG. 18). The screen data is transmitted to the user terminal 6500.

The map information database 17 includes map information of a region targeted by the present system 1.

The navigation plan data storage unit 19 includes data indicating navigation plans of a plurality of moving bodies. For example, navigation plan data may include a moving body ID which is identification information of each vessel, attributes (an overall length, an overall width, cargo, draft, and the like), and a destination.

The movement locus data storage unit 21 stores movement locus data indicating a movement locus of a vessel. Movement locus data is, for example, data of spots where each vessel had been present and time points when the vessel had been present at the spots accumulated for each moving body ID that is identification information of a vessel.

FIG. 3 shows an example of a data structure of movement locus data 210.

The movement locus data 210 may include, as data items, a locus ID 211, a moving body ID 212, a spot number 213, a position 214 (a latitude 214a and a longitude 214b), and a time and date 215.

The locus ID 211 may be identification information of each movement locus.

The moving body ID 212 is identification information of a vessel having formed the locus with the locus ID 211.

Since a movement locus is constituted by a plurality of points, a plurality of the spot numbers 213, the positions 214, and the times and dates 215 can be registered with respect to one pair of the locus ID 211 and the moving body ID 212.

The spot number 213 may be identification information of a spot constituting the movement locus.

The position 214 may be a position specified by the latitude 214a and the longitude 214b.

The time and date 215 may be a date and a time point when the vessel with the moving body ID 212 had been present at the position 214.

Next, the integrated locus data storage unit 23 stores locus data of an integrated locus obtained by integrating a plurality of movement loci into one. Integrated locus data is generated when a plurality of approximated movement loci are integrated during a process performed by the network model management unit 11 to be described later.

FIG. 4 shows an example of a data structure of integrated locus data 230.

The integrated locus data 230 may include, as data items, an integrated locus ID 231, a spot number 232, a position 233 (a latitude 233a and a longitude 233b), a corresponding locus ID 234, a start point 235, and an end point 236.

The integrated locus ID 231 is identification information of an integrated locus.

Since an integrated locus is constituted by a plurality of points, a plurality of the spot numbers 232 and the positions 233 can be registered with respect to one integrated locus ID 231.

The spot number 232 is identification information of a spot constituting the integrated movement locus.

The position 233 indicates a position of the spot number 232. The position 233 may be a position specified by the latitude 233a and the longitude 233b.

Since an integrated locus is a locus that integrates a plurality of movement loci, in the integrated locus data 230, a plurality of the corresponding locus ID 234, the start point 235, and the endpoint 236 can be registered with respect to one integrated locus ID 231.

The corresponding locus ID 234 is a locus ID of a movement locus integrated into the integrated locus ID 231.

The start point 235 may be the spot number of a spot indicating a start point of a section integrated into the integrated locus in the movement locus with the corresponding locus ID 234.

The end point 236 may be the spot number of a spot indicating an end point of the section integrated into the integrated locus in the movement locus with the corresponding locus ID 234.

Next, the network model data storage unit 25 stores data regarding a network model generated by the network model management unit 11. As will be described later, a network model may be constituted by a plurality of nodes and a plurality of edges connecting the nodes. An edge may have a direction of travel indicating a direction of a route. In other words, a network constituted by edges and nodes may be a one-way network. In the present embodiment, node data and edge data are included as network model data. In other words, the network model data storage unit 25 stores node data and edge data.

FIG. 5 shows an example of a data structure of node data 250.

The node data 250 includes, as data items, a node ID 251, a node range 252, a previous edge ID 253, a next edge ID 254, an integrated locus ID 255, and a spot number 256.

The node ID 251 is identification information of a node.

The node range 252 indicates a position where a node is configured. In the present embodiment, a node is assumed to be a range with a certain spread instead of a dot. In consideration thereof, the node range 252 may define an outer edge of a node. For example, in the present embodiment, coordinates (latitude and longitude) of four spots are set and a rectangular range constructed by the four spots is adopted as a node range.

However, a node range is not limited to a rectangle. For example, a node range may be a polygon other than a rectangle or may be any shape such as a circle or an ellipse. When a three-dimensional space is considered as a target, a node range may also have a three-dimensional shape.

A plurality of edges may be coupled to a node. Therefore, in the node data 250, a plurality of previous edge IDs 253 and next edge IDs 254 can be registered with respect to one pair of the node ID 251 and the node range 252.

The previous edge ID 253 may be an edge ID of an edge which is coupled to this node and which has a direction of travel oriented so as to enter the node. The previous edge ID 253 may exist in plurality.

The next edge ID 254 may be an edge ID of an edge which is coupled to this node and which has a direction of travel oriented so as to exit the node. The next edge ID 254 may exist in plurality.

The integrated locus ID 255 is an integrated locus ID of an integrated locus corresponding to the previous edge ID 253 and the next edge ID 254.

The spot number 256 is a spot number of an end point of the integrated locus ID 255 which is a spot of entry to the node range 252.

FIG. 6 shows an example of a data structure of edge data 260.

The edge data 260 includes, as data items, an edge ID 261, a width 262, a start point node ID 263, an endpoint node ID 264, an integrated locus ID 265, a start point spot number 266, and an end point spot number 267.

The edge ID 261 is identification information of an edge.

The width 262 indicates a width of the edge as a route. For example, a width may be a same distance as a distance threshold used when determining whether or not to integrate a plurality of loci in a network model generation process performed by the network model management unit 11 to be described later.

The start point node ID 263 is a node ID of a node to which the edge is coupled and which becomes a start point in a direction of travel of the edge.

The end point node ID 264 is a node ID of a node to which the edge is coupled and which becomes an endpoint in the direction of travel of the edge.

An edge is generated from one or more integrated loci. Therefore, in the edge data 260, one or more integrated locus IDs 265, start point spot numbers 266, and end point spot numbers 267 can be registered with respect to a combination of the edge ID 261, the width 262, the start point node ID 263, and the end point node ID 264.

The integrated locus ID 265 is an integrated locus ID of an integrated locus corresponding to the edge.

The start point spot number 266 is a spot number of a start point of the integrated locus ID 265.

The end point spot number 267 is a spot number of an end point of the integrated locus ID 265.

Figure 7:
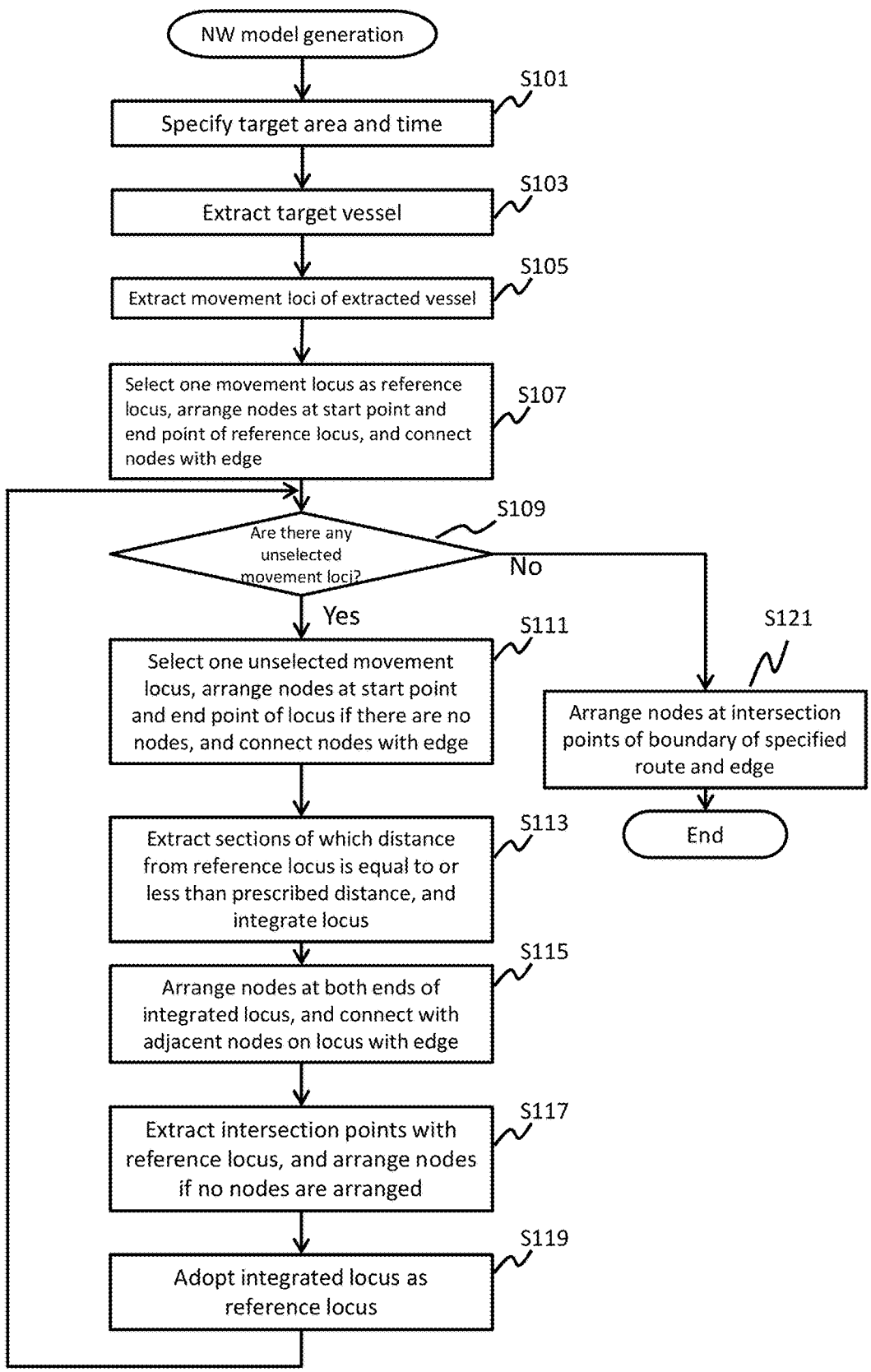
FIG. 7 is a flow chart showing a network model generation process procedure.

FIG. 7 is a flow chart showing a network model generation process procedure performed by the network model management unit 11. A detailed description will now be given while also referring to FIGS. 8 to 11.

The network model management unit 11 accepts specifications of an area and a time slot to be a target of a network model (S101). For example, a prescribed UI screen may be displayed on the display apparatus of the user terminal 6500 to accept input of specifications of an area and a time slot from a user.

Figure 8:
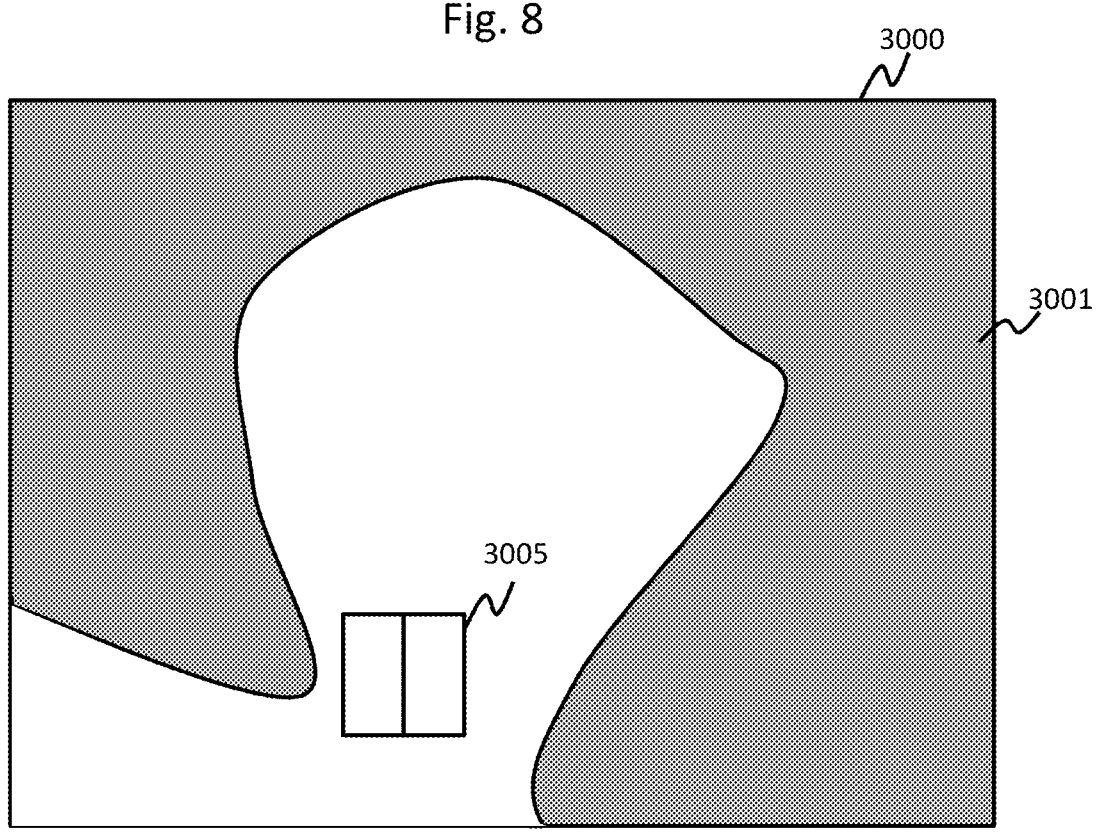
FIG. 8 shows a map screen 3000.

FIG. 8 shows the map screen 3000 displaying a map image 3001 of a specified area. In the diagram, white represents sea while gray represents land. A specified route 3005 to be described later is configured in these waters. The map screen 3000 may be displayed on the display apparatus of the user terminal 6500.

Returning to FIG. 7, the network model management unit 11 extracts a target vessel (S103). For example, the network model management unit 11 may refer to navigation plan data and the movement locus data 210 and extract a vessel scheduled to be present in the area at the time slot specified in step S101. For example, a position of the vessel at the specified time slot may be specified as follows. Specifically, the network model management unit 11 may specify a vessel expected to be present in a target area at the specified time slot on the basis of destinations and estimated movement speeds of vessels currently present in the target area and a vicinity thereof. A movement speed may be estimated on the basis of past movement locus data 210 of a same vessel, or an average movement speed in the target area of vessels of a similar size (overall length and overall width) may be applied.

The network model management unit 11 extracts movement loci of the extracted vessel (S105). The movement loci may be, for example, past movement loci determined according to the movement locus data 210. Alternatively, the network model management unit 11 may calculate the movement loci by performing statistical analysis such as regression analysis on the basis of the positions 214 of respective points constituting past movement loci in the movement locus data 210. Furthermore, when there is an impassable region due to construction or the like, the network model management unit 11 may calculate movement loci by simulation.

Figure 9:
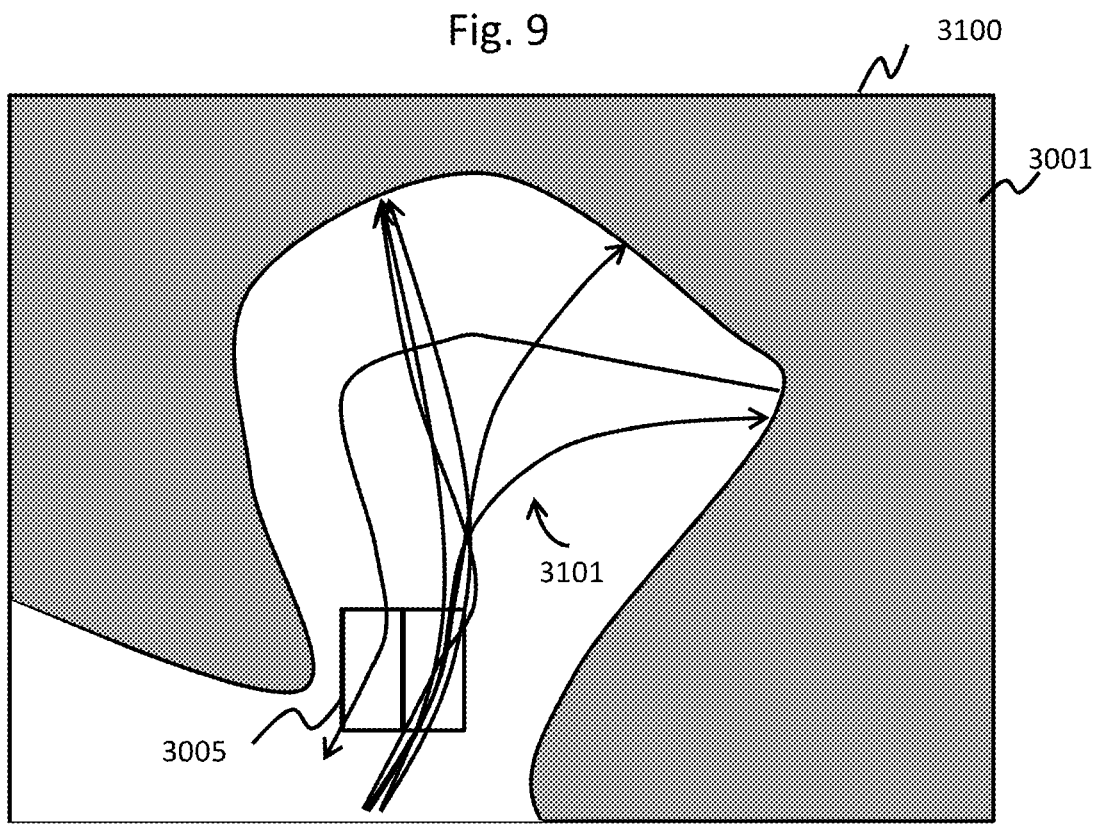
FIG. 9 represents a movement locus screen 3100.

FIG. 9 represents the movement locus screen 3100 on which a plurality of extracted movement loci 3101 are drawn so as to overlap with the map image 3001. In this case, the plurality of extracted movement loci 3101 are drawn. The movement locus screen 3100 may be displayed on the display apparatus of the user terminal 6500.

Returning to FIG. 7 once again, the network model management unit 11 extracts nodes and an edge from the movement loci extracted in step S105.

For example, the network model management unit 11 selects one of the movement loci as a reference locus. In addition, nodes are arranged at a start point and an end point of the reference locus and, at the same time, an edge connecting the two nodes is configured (S107).

The network model management unit 11 determines whether or not there remain movement loci not yet selected among the movement loci extracted in step S105 (S109). When there remain unselected movement loci (S109: Yes), the network model management unit 11 selects one of the unselected movement loci. In addition, when nodes are not present at a start point and an endpoint of the selected movement locus, the network model management unit 11 arranges nodes at the start point and the endpoint thereof and configures an edge connecting the nodes (S111).

The network model management unit 11 detects sections of which a distance between the movement locus selected in step S111 and the reference locus is equal to or less than a prescribed distance, and configures an integrated route which integrates the sections into one route (S113). For example, the integrated locus may be a center line of the selected movement locus and the reference locus. Alternatively, the integrated locus may be a set of center points of a segment when the network model management unit 11 determines the distance between the selected movement locus and the reference locus.

In this case, for example, the distance between the movement locus and the reference locus may be calculated as follows. Specifically, since both the movement locus and the reference locus are a set of points, for example, a shortest distance among the distances between one point of the selected movement locus and all of the points of the reference locus may be adopted as the distance between the point of the movement locus and the reference locus. Alternatively, a shortest distance among the distances between one point of the selected movement locus and segments connecting two adjacent points of the reference locus may be selected as the distance between the point of the movement locus and the reference locus.

The network model management unit 11 arranges nodes at both ends of the sections integrated in step S113 and connects the nodes to adjacent nodes of the reference locus with an edge (S115).

When there is an intersection point of the movement locus selected in step S111 and the reference locus, the network model management unit 11 configures a node at the intersection point if a node is not already configured (S117).

The network model management unit 11 adopts the integrated locus obtained by this process as a reference locus and repeats step S109 and thereafter (S119). At this point, when there are plurality of integrated loci (when divided into a plurality of sections), all of the integrated loci may be adopted as reference loci.

Figure 10:
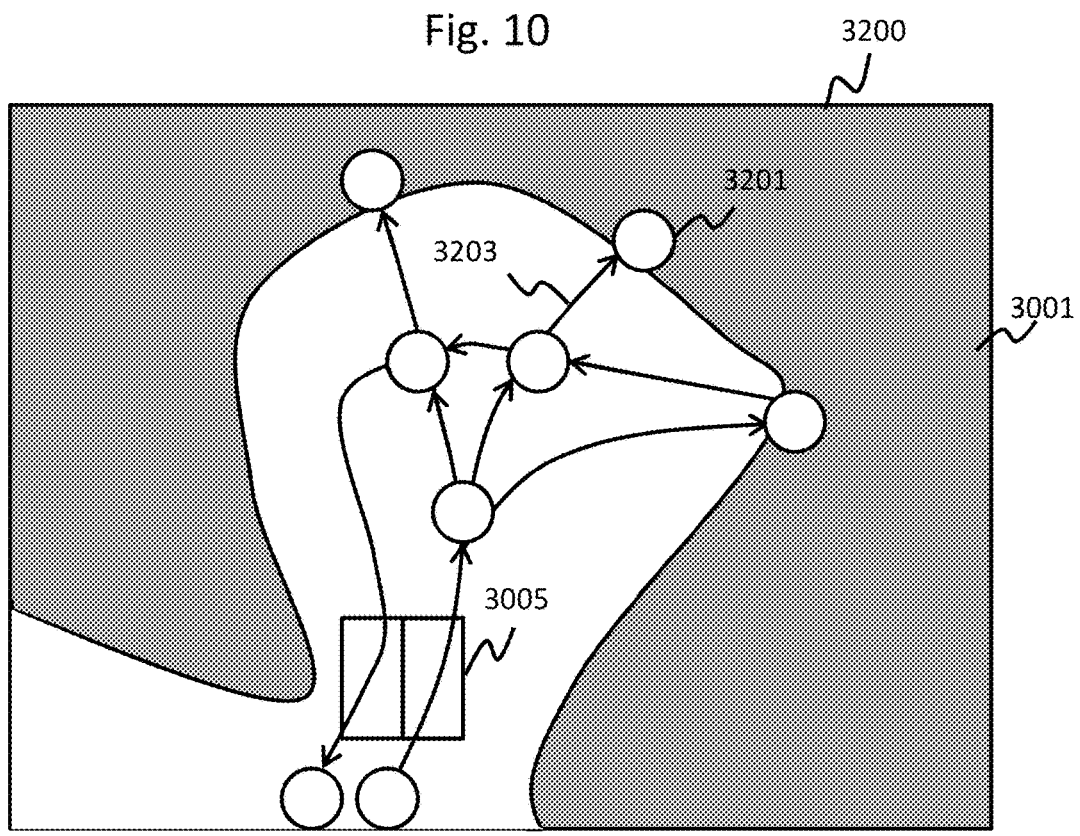
FIG. 10 shows a network model screen 3200.

FIG. 10 shows the network model screen 3200 indicating a network model generated by performing an integration process with respect to all movement loci. In the diagram, a node 3201 (in the diagram, only one is denoted by a reference numeral) is indicated by a circle. An edge 3203 (in the diagram, only one is denoted by a reference numeral) is indicated by an arrow connecting the nodes 3201. A direction of the arrow represents a direction of travel of the edge 3203. Nodes 3201 are configured at intersection points and branch points of routes. The network model screen 3200 may be displayed on the display apparatus of the user terminal 6500.

If all movement loci are already selected in step S109 (S109: No), when a specified route exists in a target area, nodes are arranged at intersection points of a boundary of the specified route with an edge (S121).

In this case, for the specified route, an area indicating a route (for example, an entrance, an exit, and a route) and rules applicable in the route (a direction of travel, a speed limit, no overtaking, and the like) may be defined. For example, as shown in FIG. 8 and the like, the specified route may be a route configured to avoid confusion near an entrance of a bay.

Figure 11:
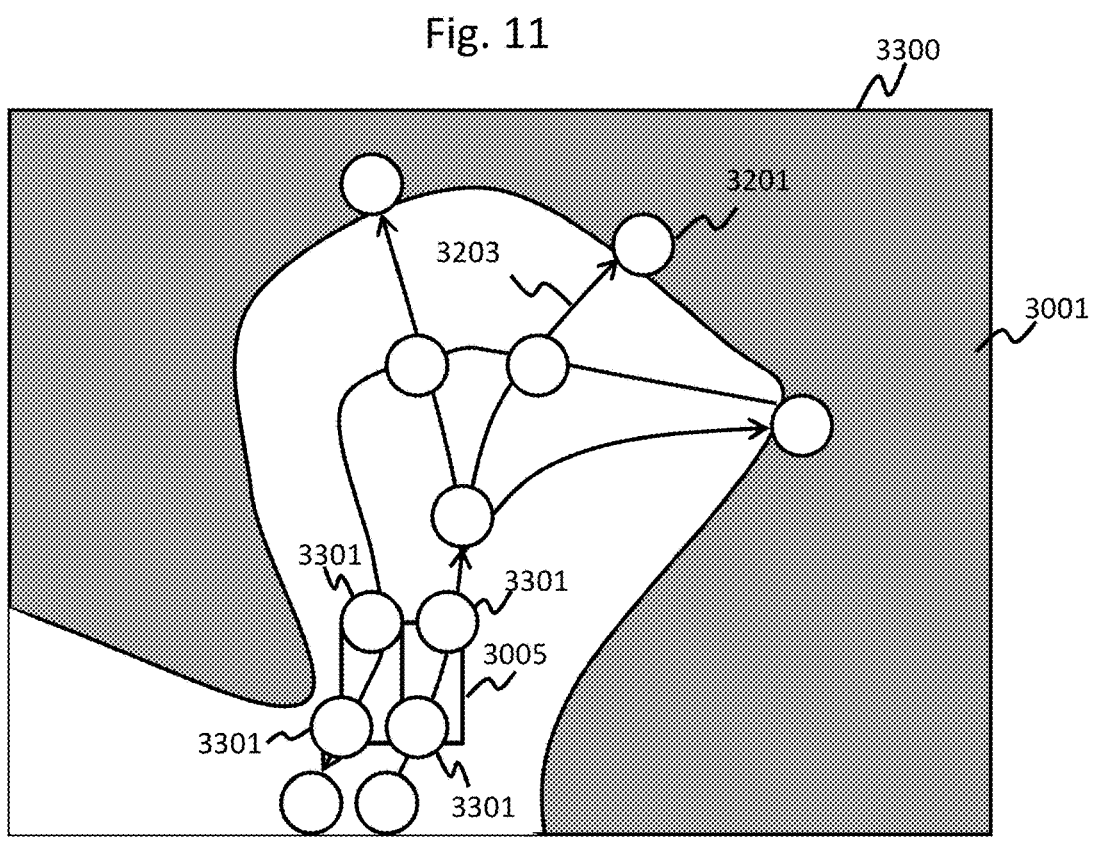
FIG. 11 shows a network model screen 3300.

Accordingly, a network model such as that shown on the network model screen 3300 in FIG. 11 is generated. With the network model shown in FIG. 11, a node 3301 has been added at an intersection point of a boundary of an area of a specified route 3005 and an edge to the network model shown in FIG. 10. The network model screen 3300 may be displayed on the display apparatus of the user terminal 6500.

Figure 12:
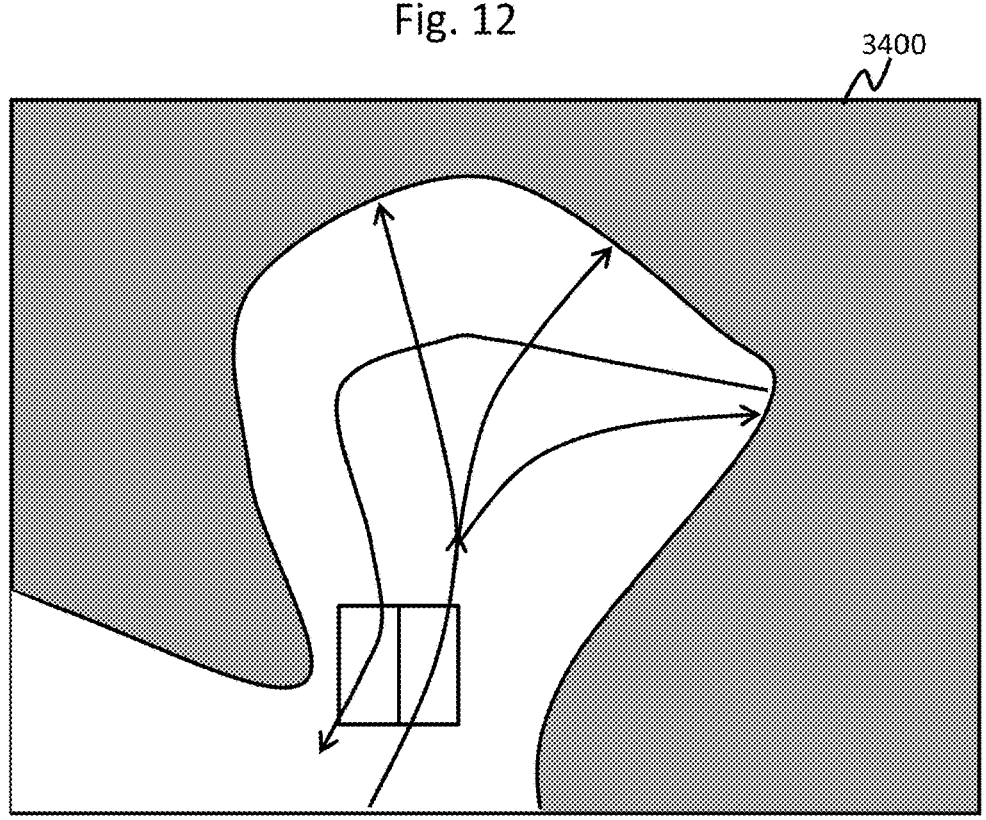
FIG. 12 shows a network model screen 3400.

FIG. 12 represents the network model screen 3400 in a display mode in which nodes are omitted and only edges are displayed on the map image 3001. The network model screen 3400 may also be displayed on the display apparatus of the user terminal 6500.

Figure 13:
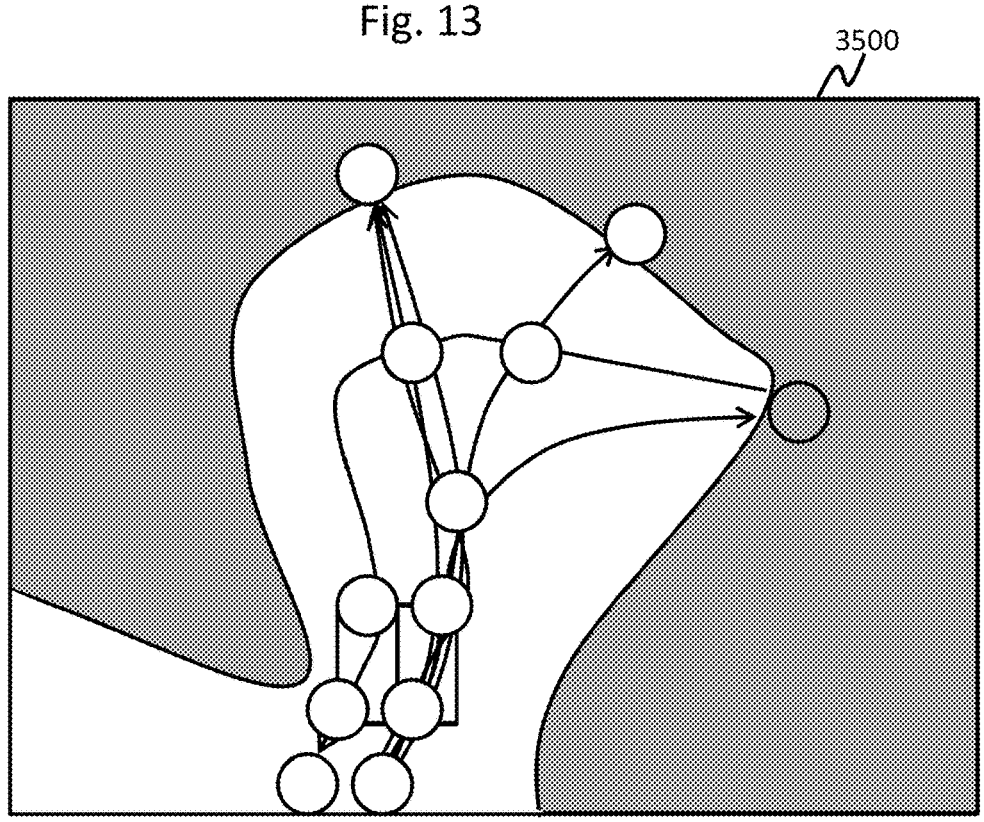
FIG. 13 shows a network model screen 3500.

In addition, FIG. 13 represents the network model screen 3500 showing movement loci of vessels additionally drawn on the network model shown in FIG. 11. The network model screen 3500 may also be displayed on the display apparatus of the user terminal 6500.

Returning to FIG. 2, the node adjustment unit 12 increases or reduces nodes included in a network model. The nodes have a function as a check point when performing navigation management in a network model. For example, the node adjustment unit 12 may increase or reduce nodes of a network model in accordance with an instruction from the user through a screen shown in FIG. 14.

Figure 14A:
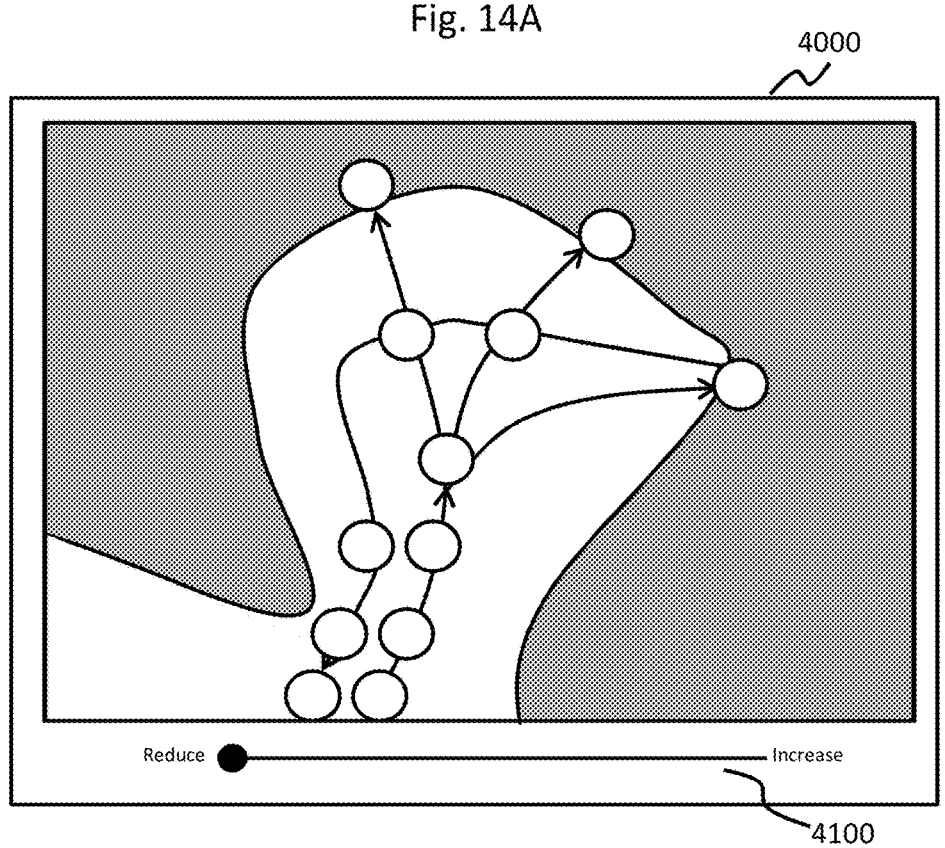
FIG. 14 shows an example of a node adjustment screen 4000.

FIG. 14 shows an example of the node adjustment screen 4000.

The node adjustment screen 4000 displays, on the map image 3001, a network model diagram based on the node data 250 and the edge data 260 stored in the network model data storage unit 25. The node adjustment screen 4000 further includes a slide bar 4100 for increasing or reducing the number of nodes. Increasing the number of nodes to shorten distances between the nodes enables accuracy of management of a navigation schedule to be increased.

Figure 14B:
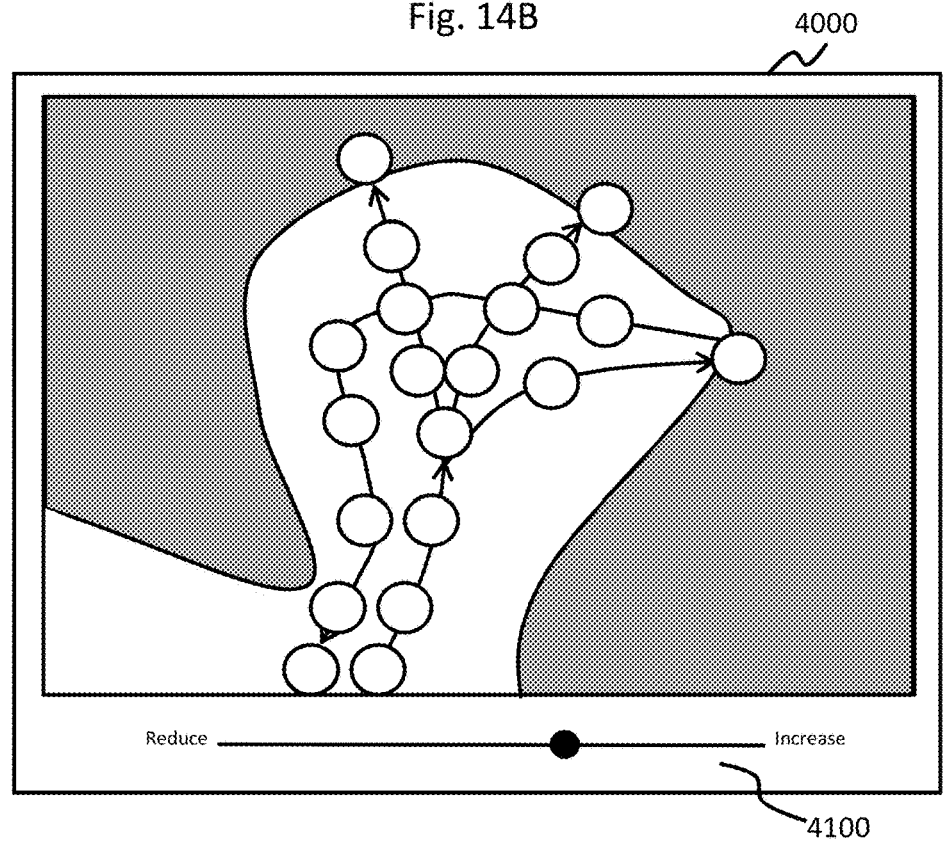

For example, when the user operates the slide bar 4100 in a direction of increasing the number of nodes, the node adjustment unit 12 configures a new node between nodes. For example, the node adjustment unit 12 may arrange nodes between nodes in a descending order of distance (a length of an edge) between the nodes (FIG. 14B). Conversely, when the user operates the slide bar 4100 in a direction of reducing the number of nodes, the node adjustment unit 12 may delete the node having been added in the process described above.

When the node adjustment unit 12 adds a node, information on the added node is stored in the node data 250. When the node adjustment unit 12 deletes a node, information on the node being a deletion target is deleted from the node data 250.

The present system 1 uses a network model generated as described above to generate a navigation schedule and supports traffic control service for safe navigation. By configuring a network model in which a prescribed route is navigated with respect to a freely navigable space, a calculation load related to processes such as generation of a navigation schedule and determination of an excessive approach risk can be significantly reduced.

Figure 15:
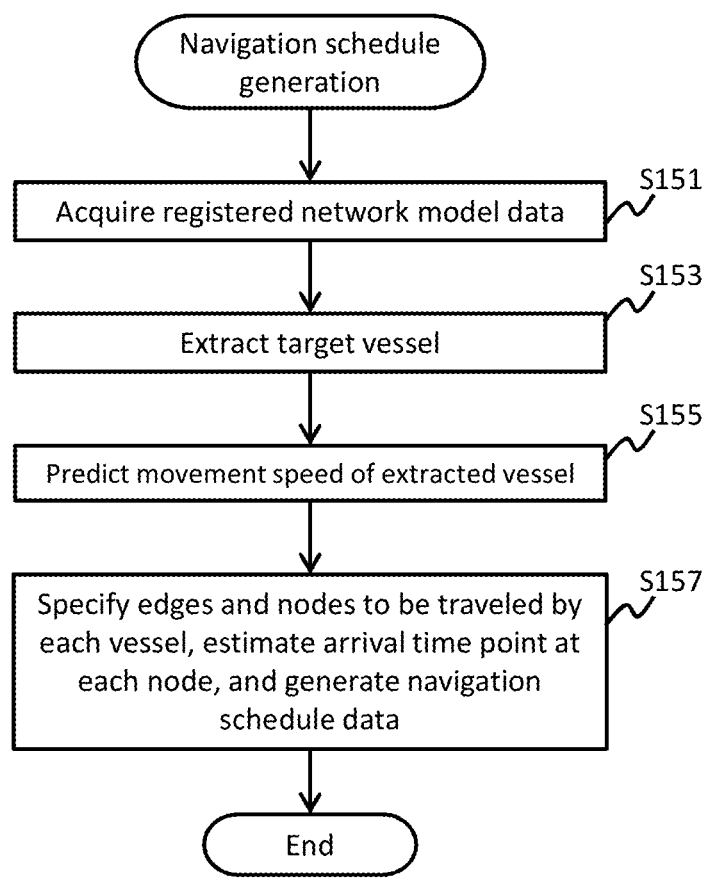
FIG. 15 is a flow chart showing a procedure of a generation process of a navigation schedule.

Next, FIG. 15 is a flow chart showing a procedure of a generation process of a navigation schedule when vessels navigate in accordance with a network model.

The navigation schedule calculation unit 13 acquires network model data from the network model data storage unit 25 (S151). At this point, the navigation schedule calculation unit 13 may accept specifications of a target area and a target time in a similar manner to step S101.

The navigation schedule calculation unit 13 extracts a target vessel in a similar manner to step S103 (S153).

The navigation schedule calculation unit 13 estimates a movement speed of the target vessel (S155). For example, on the basis of a moving body ID of the target vessel, the navigation schedule calculation unit 13 may read past movement locus data from the movement locus data storage unit 21 to calculate a past movement speed and estimate the calculated past movement speed as a future movement speed. Alternatively, a past movement speed may be calculated from movement locus data of other vessels with a similar total length and a similar total width to the target vessel and the calculated past movement speed may be adopted as a movement speed of the target vessel.

The navigation schedule calculation unit 13 specifies edges and nodes which are to be traveled by each vessel on the network model from navigation plan data, and estimates an estimated arrival time point at each node from the movement speed estimated in step S155 to generate navigation schedule data (S157). The navigation schedule data generated at this point is stored in the navigation schedule data storage unit 27.

The navigation schedule generated at this point may be corrected in accordance with prescribed constraints as will be described later.

Next, a traffic control support process using a network model will be described.

When there is a risk that a first moving body and a second moving body are to approach each other over a prescribed criterion in a navigation schedule in accordance with a network model, the traffic control support processing unit 14 may perform a process of outputting a prescribed alert to the first moving body and the second moving body. When a time difference between estimated arrival time points of the first moving body and the second moving body at a prescribed spot is within a prescribed time, the traffic control support processing unit 14 may determine that there is an excessive approach risk. The traffic control support processing unit 14 may perform a process of correcting a navigation schedule so as to satisfy a constraint configured for the purpose of avoiding excessive approach between the moving bodies. The constraint may be that a time difference between estimated arrival time points of a plurality of moving bodies at a prescribed spot is equal to or larger than a prescribed time.

The traffic control support processing unit 14 may calculate an estimated time point of arrival of a plurality of moving bodies at each node in the network model. Each node may have a first constraint regarding a time interval of the navigation schedule. The traffic control support processing unit 14 may correct the navigation schedule so that a time interval between the estimated time point of arrival of the first moving body at a first node and the estimated time point of arrival of the second moving body at the first node in the navigation schedule satisfies the first constraint.

A second node installed at an intersection point of a first route and a second route may have a second constraint related to a priority order based on directions of travel of routes. In addition, the traffic control support processing unit 14 may correct the navigation schedule so that a time interval between an estimated time point of arrival of a third moving body at a second node and an estimated time point of arrival of a fourth moving body at the second node in the navigation schedule satisfies the first constraint and that the time interval is in accordance with the priority order of the second constraint.

Figure 16:
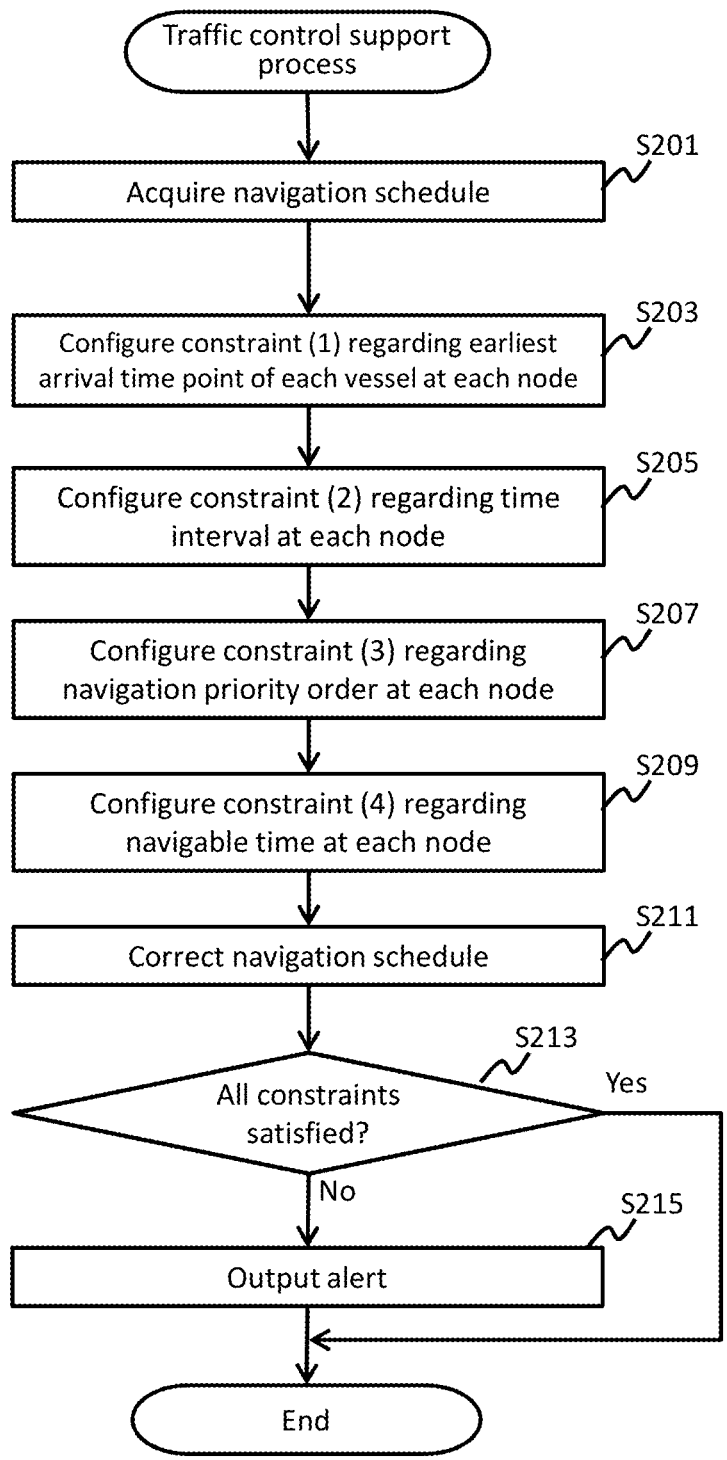
FIG. 16 is a flow chart showing a processing procedure of a traffic control support process.

FIG. 16 is a flow chart showing a processing procedure of a traffic control support process. In the traffic control support process described below, a navigation schedule may be adjusted so as to satisfy constraints and, when all constraints cannot be satisfied, an alert may be output to a target vessel to invite attention to navigation.

First, the traffic control support processing unit 14 acquires navigation schedule data from the navigation schedule data storage unit 27 (S201).

The traffic control support processing unit 14 configures a constraint (1) with respect to an earliest estimated arrival time point (an earliest arrival time point) at which vessels arrive at each node (S203). Since each vessel cannot arrive at each node before the earliest arrival time point, this constitutes a constraint.

For example, in the navigation schedule, the traffic control support processing unit 14 may specify, for each node, an estimated arrival time point of each vessel scheduled to pass the node and adopt each estimated arrival time point as the constraint (1) per node and per vessel.

Next, the traffic control support processing unit 14 configures a constraint (2) regarding a time interval at which vessels arrive at each node (S205). This time interval is defined in consideration of navigation safety. For example, in the navigation schedule, when a time difference between estimated arrival time points of two or more vessels at a certain node is shorter than the time interval defined by the constraint (2), a determination may be made that there is a risk of the two or more vessels excessively approaching one another.

In the present embodiment, while a time interval from an arrival of a certain vessel to an arrival of a next vessel is set to 5 minutes, other time intervals may be adopted instead. In addition, in the present embodiment, while the time interval of the constraint (2) is common among all nodes, the time interval may be varied according to nodes. For example, for nodes at or under a certain distance from land, the time interval may be set longer than other nodes or set shorter than other nodes.

Next, the traffic control support processing unit 14 configures a constraint (3) regarding a navigation priority order with respect to nodes arranged at intersection points (S207).

Figure 17A:
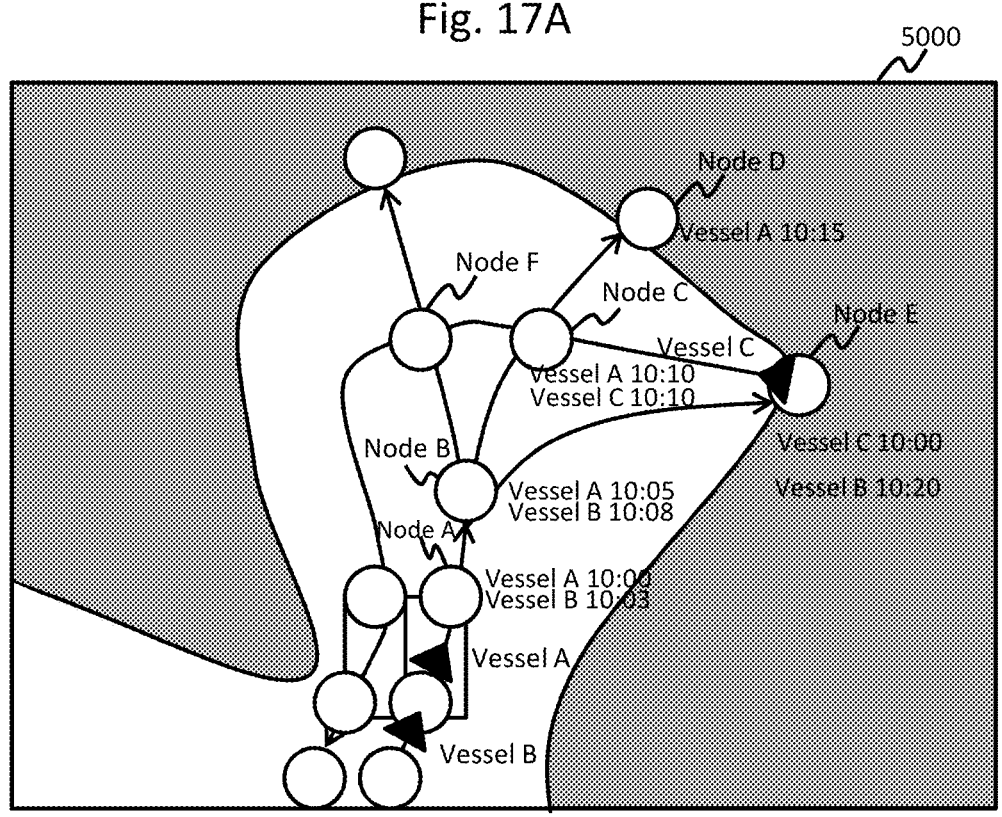
FIG. 17 is an explanatory diagram of a navigation schedule and constraints.
Figure 17B:
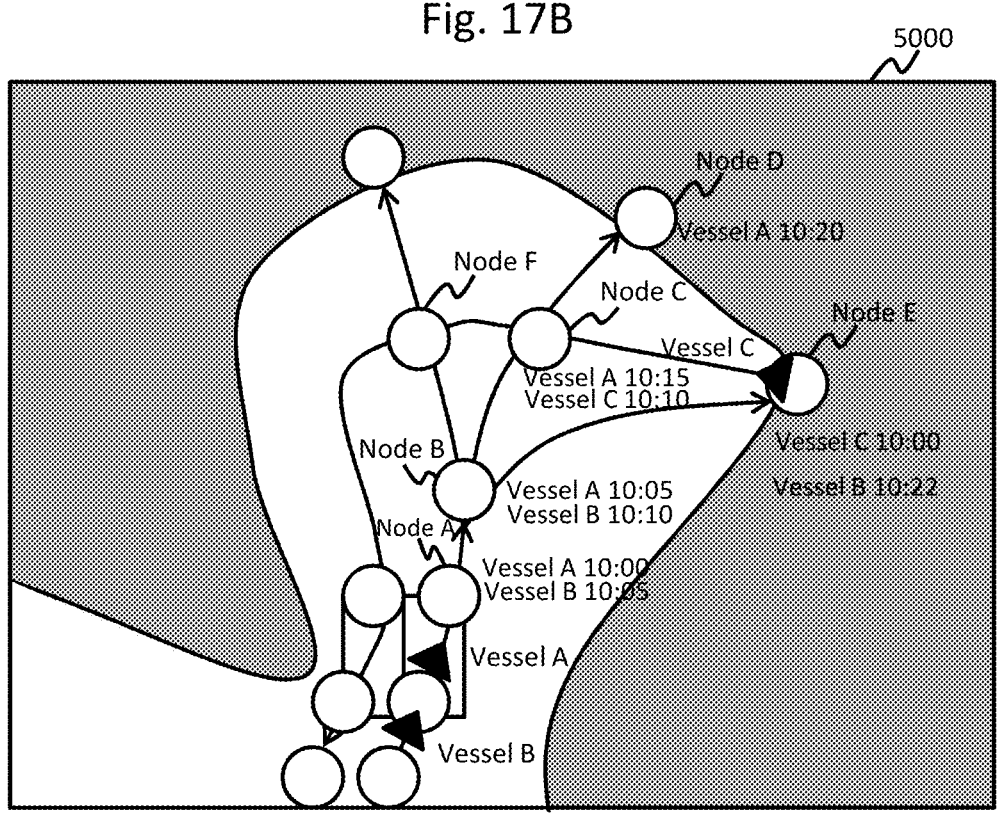

FIG. 17 shows an example of the navigation schedule data display screen 5000. The constraint (3) will be described with reference to the diagram. FIG. 17 shows a vessel A scheduled to proceed in an order of nodes A→B→C→D and a vessel C scheduled to proceed in an order of nodes E→C→F. In addition, it is assumed that the earliest estimated arrival time points of the vessels at the node C are a same time point. In such a case, travel of one of the vessels must be prioritized according to maritime traffic rules. In consideration thereof, the traffic control support processing unit 14 may configure a constraint (3) regarding a navigation priority order in accordance with maritime traffic rules. In the example shown in FIG. 17, the traffic control support processing unit 14 configures a constraint (3) which prioritizes a vessel proceeding on a route from starboard to port.

Returning to FIG. 16, the traffic control support processing unit 14 configures a constraint (4) corresponding to individual events (S209). For example, when navigation at a specific time slot in a specific area is restricted due to insufficient water depth caused by low tide, a restriction due to opening and closing times of a floodgate, construction, and the like, the constraint (4) may be individually configured at nodes on routes affected by such restrictions. The constraint (4) may be specified by user input.

The traffic control support processing unit 14 adjusts the estimated arrival time point of each vessel at each node and corrects the navigation schedule so as to satisfy the constraints (1) to (4) defined as described above and stores the corrected navigation schedule in the navigation schedule data storage unit 27 (S211).

Correction of a navigation schedule will be specifically described with reference to FIGS. 17 and 18.

FIG. 18A shows navigation schedule data 270A calculated by the navigation schedule calculation unit 13. FIG. 17A represents a navigation schedule expressed on a map.

The navigation schedule data 270A represents a time point calculated by the navigation schedule calculation unit 13 at which each vessel is expected to arrive at each node. Therefore, this time point is the earliest arrival time point of each vessel at each node (constraint (1)). The constraint (1) of the nodes A and B is represented by mathematical expressions as follows.

Constraint (1) Related to Node $A$ $$\text{Moving body } ID\text{:}001(\text{vessel } A)\text{Arrival\_time\_}001\_A >= 10\text{:}00 \tag{1}$$

$$\text{Moving body } ID\text{:}002(\text{vessel } B)\text{Arrival\_time\_}002\_A >= 10\text{:}03 \tag{2}$$

Constraint (1) Related to Node $B$ $$\text{Moving body } ID\text{:}001(\text{vessel } A)\text{Arrival\_time\_}001\_B >= 10\text{:}05 \tag{3}$$

Moving body *ID*:002(vessel *B*)Arrival_time_ 002

$$B>=10:08 \quad (4)$$

Since the constraint (2) is "a difference in estimated arrival time points of vessels at all nodes is 5 minutes or more", the traffic control support processing unit 14 adjusts estimated arrival time points so that this condition is satisfied at all nodes.

In an initial navigation schedule, the time difference between the vessel A and the vessel B at the node A is 3 minutes (mathematical expressions (1) and (2) above). Therefore, the traffic control support processing unit 14 sets the estimated arrival time point of the vessel B to 10:05 so as to satisfy the constraint (2). In a similar manner, since the time difference between the vessel A and the vessel B at the node B is also 3 minutes (mathematical expressions (3) and (4) above), the traffic control support processing unit 14 sets the estimated arrival time point of the vessel B to 10:10 so as to satisfy the constraints (1) and (2).

The constraint (3) regarding the node C is "prioritize vessels heading towards the node F from the node E over vessels heading towards the node D from the node B". For example, at the node C, when the time difference between estimated arrival time points of the vessel A arriving from the node B and the vessel C arriving from the node E is within ±5 minutes, the traffic control support processing unit 14 adjusts the estimated arrival time points at the node C so that the vessel C arriving from the node E passes first and the vessel A arriving from the node B passes 5 minutes or more after the passage of the vessel C.

In the example shown in FIG. 18A, since the estimated arrival time points of the vessels A and C at the node C are both 10:10, the vessel C is prioritized. In other words, the traffic control support processing unit 14 configures the constraint (3) which causes the estimated arrival time point of the vessel A at the node C to be 5 minutes or more before or 5 minutes or more after 10:10. The constraint (3) is represented by mathematical expressions as follows.

Constraint (3) Related to Node *C*

Arrival_time_001_003>=10:10+0:05OR $$\text{Arrival\_time\_001\_003}<=10:10-0:05 \quad (5)$$

The traffic control support processing unit 14 adjusts the estimated arrival time point of the vessel A so as to satisfy the constraints (1) to (3) to 10:15.

At this point, assuming that the constraint (4) has not been configured, FIG. 18B represents the navigation schedule after corrections are made so as to satisfy all constraints.

Moreover, the navigation schedule data display screen 5000 shown in FIG. 17 and the tabular navigation schedule data shown in FIG. 18 may both be displayed on the display apparatus of the user terminal 6500.

Returning to FIG. 16, a determination is made on whether or not the navigation schedule corrected in step S211 satisfies all constraints (S213). When all of the constraints are satisfied, the process is ended (S213: Yes).

On the other hand, when the corrected navigation schedule does not satisfy all constraints (S213: No), the traffic control support processing unit 14 outputs a prescribed alert indicating a navigational risk (S215). This alert may be notified to vessels at risk via the communication server 6100 or may be notified to the user by performing a prescribed display on the display apparatus of the user terminal 6500. For example, vessels unable to satisfy the constraint (2) or (3) may be determined to be at risk of excessive approach to other vessels and may be notified to this effect.

Figure 19:
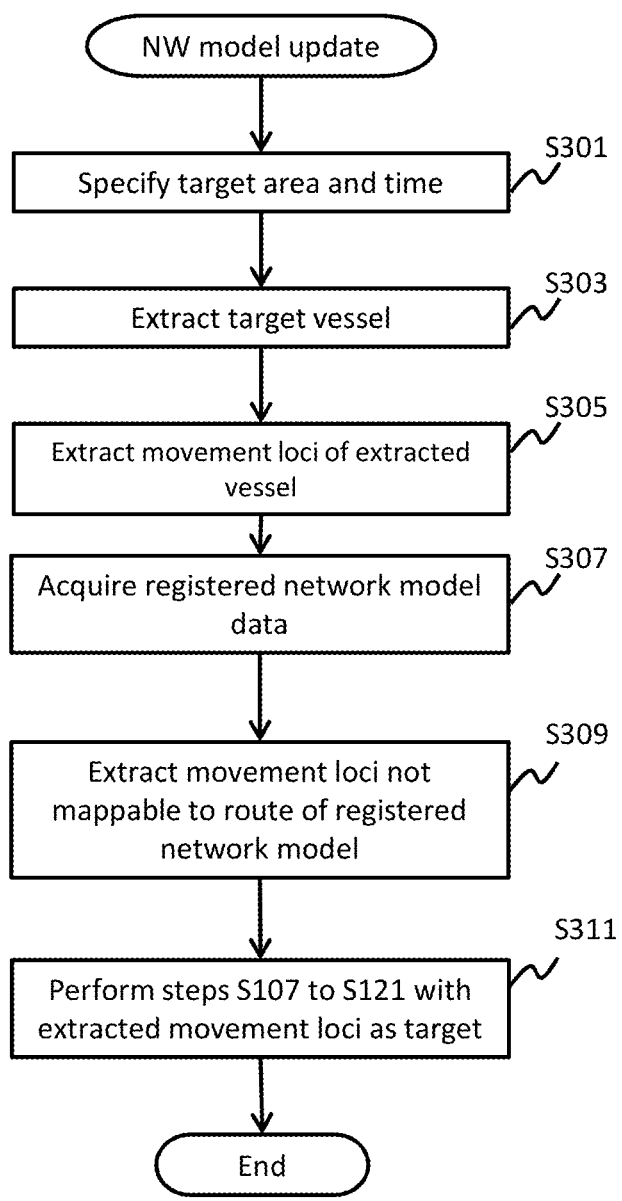
FIG. 19 is a flow chart showing a network model update process procedure.

FIG. 19 shows a processing procedure for updating a network model. A need to change a route may arise due to external factors such as meteorological conditions, the presence of an obstacle, and construction. In consideration thereof, in the present system 1, network models can be changed dynamically. The network model update process is performed by the network model management unit 11.

The network model management unit 11 accepts specifications of an area and a time slot of a network model to be updated in a similar manner to step S101 (S301).

The network model management unit 11 extracts a target vessel in a similar manner to step S103 (S303).

The network model management unit 11 extracts movement loci of the vessels extracted in step S303 in a similar manner to step S105 (S305).

The network model management unit 11 acquires the node data 250 and the edge data 260 of the network model to be updated from the network model data storage unit 25 (S307).

The network model management unit 11 maps the movement loci extracted in step S305 to an existing network model and extracts movement loci not matching the network model (S309). For example, the network model management unit 11 may determine that a movement locus of which a section outside of the edge width 262 and the node range 252 continues for a prescribed distance or more does not match the network model.

The network model management unit 11 performs the process of steps S107 to S121 with respect to movement loci extracted in step S309 (S311). Accordingly, by adding new nodes and edges to an existing network model, the network model can be updated.

According to the present embodiment, even when a route is changed due to various external factors, a network model can be promptly changed.

The embodiment of the present invention described above merely represents an example for illustrating the present invention, and it is to be understood that the scope of the present invention is not limited to the embodiment. It will be obvious to those skilled in the art that the present invention can be implemented in various other modes without departing from the spirit of the present invention.

For example, the communication server 6100, the map information server 6200, the locus information server 6300, the traffic control support server 6400, and the user terminal 6500 may be realized in a concentrated manner by organizing the servers into one computer machine, realized by dividing each server to a different computer machine, or realized by appropriately distributing the servers among a plurality of computer machines.

REFERENCE SIGNS LIST

1 Moving body management system
11 Network model management unit
12 Node adjustment unit
13 Navigation schedule calculation unit
14 Traffic control support processing unit
15 Display processing unit
17 Map information database
19 Navigation plan data storage unit
21 Movement locus data storage unit
23 Integrated locus data storage unit
25 Network model data storage unit
27 Navigation schedule data storage unit

The invention claimed is:

1. A moving body management system, comprising:
   a storage device configured to store movement locus data showing a plurality of movement loci in which a moving body has moved in a two-dimensional or three-dimensional space in which free movement is possible, wherein the space is navigable water; and
   a CPU (Central Processing Unit), wherein
   the CPU is configured to execute:
   a process of selecting a reference movement locus among the plurality of movement loci, arranging respective nodes at a previously stored start point and a previously stored end point of the reference movement locus and an edge connecting the respective nodes, and for each of the plurality of movement loci:
   arranging respective nodes at a previously stored start point and a previously stored end point and an edge connecting the respective nodes, determine a plurality of integrated sections of the respective plurality of movement loci which are a predetermined distance or less from the reference movement locus on the basis of the stored movement locus data, arranging nodes at respective ends of each of the integrated sections and connecting the nodes to adjacent nodes of the reference movement locus with an edge, determining intersections of the respective plurality of movement loci and the reference movement locus based on the edges and arranging nodes at the respective intersections, and generating a network model showing a plurality of routes within the space which are defined by the plurality of integrated movement loci and the arranged nodes;
   a process of calculating a navigation schedule when a plurality of moving bodies planning to pass within the space navigate within that space according to the routes of the network model; and
   a process of outputting the calculated navigation schedule to a display apparatus;
   wherein the process of calculating a navigation schedule includes a process of calculating estimated arrival time points at a prescribed spot within the network model on the basis of movement speeds of the plurality of moving bodies, at least two moving bodies of the plurality of moving bodies moving along paths that overlap each other at the prescribed spot; and
   wherein the calculated navigation schedule is used to avoid approach between the moving bodies.

2. The moving body management system according to claim 1, wherein the at least two moving bodies reach the prescribed spot at different estimated arrival time points.

3. The moving body management system according to claim 1, wherein the CPU is further configured to execute:
   when there is a risk that a first moving body and a second moving body are to approach each other over a prescribed criterion in the navigation schedule, a process of outputting a prescribed alert to the first moving body and the second moving body.

4. The moving body management system according to claim 3, wherein the CPU is further configured to:
   determine that there is a risk of approach over a prescribed criterion when a time difference between estimated arrival time points of the first moving body and the second moving body at the prescribed spot is within a prescribed time.

5. The moving body management system according to claim 1, wherein the CPU is further configured to:
   further perform a process of correcting the navigation schedule so as to satisfy a constraint configured for the purpose of avoiding approach over a prescribed criterion between the moving bodies.

6. The moving body management system according to claim 5, wherein the constraint is that a time difference between estimated arrival time points of each of the at least two moving bodies at the prescribed spot is equal to or larger than a prescribed time.

7. The moving body management system according to claim 1, wherein
   the process of calculating a navigation schedule involves calculating estimated time points at which the plurality of moving bodies are to arrive at each of the nodes.

8. The moving body management system according to claim 7, wherein
   each node has a first constraint regarding a time interval of the navigation schedule,
   the process of calculating a navigation schedule includes a process of correcting the navigation schedule so that a time interval between an estimated time point of arrival of a first moving body at a first node and an estimated time point of arrival of a second moving body at the first node in the navigation schedule satisfies the first constraint, and
   the first constraint is configured for the purpose of avoiding approach over a prescribed criterion between the moving bodies.

9. The moving body management system according to claim 8, wherein
   a second node installed at an intersection point of a first route and a second route has a second constraint related to a priority order based on directions of travel of routes, and
   the navigation schedule is corrected so that a time interval between an estimated time point of arrival of a third moving body at a second node and an estimated time point of arrival of a fourth moving body at the second node in the navigation schedule satisfies the first constraint and that the time interval is in accordance with the priority order of the second constraint,
   the first and second constraints are configured for the purpose of avoiding approach over a prescribed criterion between the moving bodies.

10. A moving body management method carried out by an information processing apparatus having movement locus data showing a plurality of movement loci in which a moving body has moved in a two-dimensional or three-dimensional space in which free movement is possible, wherein the space is navigable water, the moving body management method comprising:
    selecting a reference movement locus among the plurality of movement loci, arranging respective nodes at a previously stored start point and a previously stored end point of the reference movement locus and an edge connecting the respective nodes, and for each of the plurality of movement loci:
    arranging respective nodes at a previously stored start point and a previously stored end point and an edge connecting the respective nodes, determining a plurality of integrated sections of the respective plurality of movement loci which are a predetermined distance or less from the reference movement locus on the basis of the stored movement locus data, arranging nodes at respective ends of each of the integrated sections and connecting the nodes to adjacent nodes of the reference movement locus with an edge, determining intersections of the respective plurality of movement loci and the reference movement locus based on the edges and arranging nodes at the respective intersections, and generating a network model showing a plurality of routes within the space which are defined by the plurality of integrated movement loci and the arranged nodes;

calculating a navigation schedule when a plurality of moving bodies planning to pass within the space navigate within that space according to the routes of the network model; and outputting the calculated navigation schedule to a display apparatus;

wherein calculating the navigation schedule includes calculating estimated arrival time points at a prescribed spot within the network model on the basis of movement speeds of the plurality of moving bodies, at least two moving bodies of the plurality of moving bodies moving along paths that overlap each other at the prescribed spot; and wherein the calculated navigation schedule is used to avoid approach between the moving bodies.

11. A moving body management system, comprising a computer programmed to:

store movement locus data showing a plurality of movement loci in which a moving body has moved in a two-dimensional or three-dimensional space in which free movement is possible, wherein the space is navigable water;

select a reference movement locus among the plurality of movement loci, arranging respective nodes at a previously stored start point and a previously stored end point of the reference movement locus and an edge connecting the respective nodes, and for each of the plurality of movement loci:

arrange respective nodes at a previously stored start point and a previously stored end point and an edge connecting the respective nodes, determine a plurality of integrated sections of the respective plurality of movement loci which are a predetermined distance or less from the reference movement locus on the basis of the stored movement locus data, arrange nodes at respective ends of each of the integrated sections and connecting the nodes to adjacent nodes of the reference movement locus with an edge, determining intersections of the respective plurality of movement loci and the reference movement locus based on the edges and arrange nodes at the respective intersections, and generate a network model that shows a plurality of routes within the space which are defined by the plurality of integrated movement loci and the arranged nodes;

calculate a navigation schedule including estimated arrival time points of a plurality of moving bodies planning to pass within the space at the respective nodes when the moving bodies navigate within that space according to the routes of the network model;

correct the navigation schedule on the basis of constraints included in the respective nodes and regarding a time interval of estimated arrival time points of moving bodies and the navigation schedule, by adjusting the estimated arrival time points of the plurality of moving bodies at the respective nodes so as to satisfy the constraints; and output the corrected navigation schedule;

wherein calculating the navigation schedule includes calculating estimated arrival time points at a prescribed spot within the network model on the basis of movement speeds of the plurality of moving bodies, at least two moving bodies of the plurality of moving bodies moving along paths that overlap each other at the prescribed spot; and wherein the calculated navigation schedule is used to avoid approach between the moving bodies.

12. The moving body management method according to claim 10, further comprising:

determining that there is a risk of approach over a prescribed criterion when a time difference between estimated arrival time points of the first moving body and the second moving body at the prescribed spot is within a prescribed time; and outputting a prescribed alert to the first moving body and the second moving body.

13. The moving body management method according to claim 10, further comprising:

correcting the navigation schedule so as to satisfy a constraint configured for the purpose of avoiding approach over a prescribed criterion between the moving bodies.

14. The moving body management method according to claim 13, wherein the constraint is that a time difference between estimated arrival time points of each of the at least two moving bodies at the prescribed spot is equal to or larger than a prescribed time.

15. The moving body management method according to claim 10, wherein calculating the navigation schedule involves calculating estimated time points at which the plurality of moving bodies are to arrive at each node.

16. The moving body management method according to claim 15, wherein each node has a first constraint regarding a time interval of the navigation schedule, calculating the navigation schedule includes correcting the navigation schedule so that a time interval between an estimated time point of arrival of a first moving body at a first node and an estimated time point of arrival of a second moving body at the first node in the navigation schedule satisfies the first constraint, and the first constraint is configured for the purpose of avoiding approach over a prescribed criterion between the moving bodies.

17. The moving body management method according to claim 16, wherein a second node installed at an intersection point of a first route and a second route has a second constraint related to a priority order based on directions of travel of routes, the method further comprising:

correcting the navigation schedule so that a time interval between an estimated time point of arrival of a third moving body at a second node and an estimated time point of arrival of a fourth moving body at the second node in the navigation schedule satisfies the first constraint and that the time interval is in accordance with the priority order of the second constraint, wherein the first and second constraints are configured for the purpose of avoiding approach over a prescribed criterion between the moving bodies.

18. The moving body management system according to claim 11, wherein the computer is programmed to:

determine that there is a risk of approach over a prescribed criterion when a time difference between estimated arrival time points of the first moving body and the second moving body at the prescribed spot is within a prescribed time; and output a prescribed alert to the first moving body and the second moving body.

19. The moving body management system according to claim 11, wherein the computer is programmed to:
 correct the navigation schedule so as to satisfy a constraint configured for the purpose of avoiding approach over a prescribed criterion between the moving bodies.

20. The moving body management system according to claim 19, wherein the constraint is that a time difference between estimated arrival time points of each of the at least two moving bodies at the prescribed spot is equal to or larger than a prescribed time.

* * * * *